(12) United States Patent
Manzanillo

(10) Patent No.: US 11,838,444 B1
(45) Date of Patent: Dec. 5, 2023

(54) QUEUING CALLS BASED ON DISTURBANCE

(71) Applicant: Intrado Life & Safety, Inc., Longmont, CO (US)

(72) Inventor: Mario Manzanillo, Dollard-des-Ormeaux (CA)

(73) Assignee: Intrado Life & Safety, Inc., Longmont, CO (US)

( * ) Notice: Subject to any disclaimer, the term of this patent is extended or adjusted under 35 U.S.C. 154(b) by 0 days.

(21) Appl. No.: 16/989,553

(22) Filed: Aug. 10, 2020

(51) Int. Cl.
*H04M 3/436* (2006.01)
*H04M 7/12* (2006.01)
*H04M 7/00* (2006.01)

(52) U.S. Cl.
CPC ....... *H04M 3/4365* (2013.01); *H04M 7/0075* (2013.01); *H04M 7/0081* (2013.01); *H04M 7/1275* (2013.01)

(58) Field of Classification Search
CPC ............. H04M 3/4365; H04M 7/0075; H04M 7/0081; H04M 7/1275
USPC .......................................................... 455/415
See application file for complete search history.

(56) References Cited

U.S. PATENT DOCUMENTS

| | | | |
|---|---|---|---|
| 8,724,795 | B1 | 5/2014 | Aldrich et al. |
| 10,477,025 | B1* | 11/2019 | Edwards ............. H04M 3/5232 |
| 2006/0168006 | A1 | 7/2006 | Shannon et al. |
| 2006/0209797 | A1* | 9/2006 | Anisimov ........... H04M 7/1255 |
| | | | 370/352 |
| 2007/0116223 | A1 | 5/2007 | Burke et al. |
| 2007/0121596 | A1* | 5/2007 | Kurapati ............. H04M 7/0078 |
| | | | 370/356 |
| 2007/0156919 | A1 | 7/2007 | Potti et al. |
| 2009/0089866 | A1 | 4/2009 | Yato et al. |
| 2009/0190750 | A1 | 7/2009 | Xie et al. |
| 2010/0322402 | A1* | 12/2010 | Ramanathan ..... H04M 3/42059 |
| | | | 379/211.01 |
| 2011/0239395 | A1 | 10/2011 | Wunsch |
| 2011/0280160 | A1 | 11/2011 | Yang |
| 2012/0057690 | A1 | 3/2012 | Cutajar |
| 2012/0137224 | A1 | 5/2012 | Carlsen et al. |
| 2012/0208492 | A1 | 8/2012 | Tschofenig et al. |
| 2012/0263173 | A1 | 10/2012 | Elburg et al. |
| 2013/0010947 | A1 | 1/2013 | Bushey et al. |
| 2014/0341358 | A1 | 11/2014 | Goswami et al. |
| 2016/0173687 | A1 | 6/2016 | Ehrlich et al. |
| 2016/0277578 | A1 | 9/2016 | Williams et al. |
| 2017/0034148 | A1 | 2/2017 | Rapaport et al. |
| 2017/0063602 | A1 | 3/2017 | Menezes et al. |
| 2018/0152558 | A1 | 5/2018 | Chan et al. |
| 2018/0374108 | A1 | 12/2018 | Kannan et al. |
| 2020/0280857 | A1 | 9/2020 | Filart |
| 2020/0322483 | A1 | 10/2020 | Anand |
| 2020/0412870 | A1 | 12/2020 | Tatourian et al. |

* cited by examiner

*Primary Examiner* — Ahmad F. Matar
*Assistant Examiner* — Jirapon Tulop
(74) *Attorney, Agent, or Firm* — Patent Capital Group

(57) ABSTRACT

An example operation may include one or more of receiving, via a telephone network, a Voice over IP (VOIP) call from a network device, detecting a disturbance value from a tag that has been added to a VOIP message of the VOIP call, determining an answer priority of the VOIP call based on the disturbance value, and processing the VOIP call based on the determined answer priority.

17 Claims, 7 Drawing Sheets

TAGGED CALL MESSAGE     220B

INVITE sip:bob@biloxi.example.com SIP/2.0     222

224

Via: SIP/2.0/TCP 10..0.100;branch=z9hG4bK74bf9
  Max-Forwards: 70
  From: Alice <sip:alice@atlanta.example.com>;tag=9fxced76sl
  To: Bob <sip:bob@biloxi.example.com>
  Call-ID: 3848276298220188511@atlanta.example.com
  CSeq: 1 INVITE
  Contact: <sip:alice@client.atlanta.example.com;transport=tcp>
  Content-Type: application/sdp
  Content-Length: 151

Call Score: 75    *230*    *231*
  Score Reason: Too Many Calls
  Action: Keep at end of Queue
       *232*

--- BLANK ---     226

228 v=0
o = -5894032 5894032 IN IP4 10.2.0.100
S=SDP Media Session
. . .

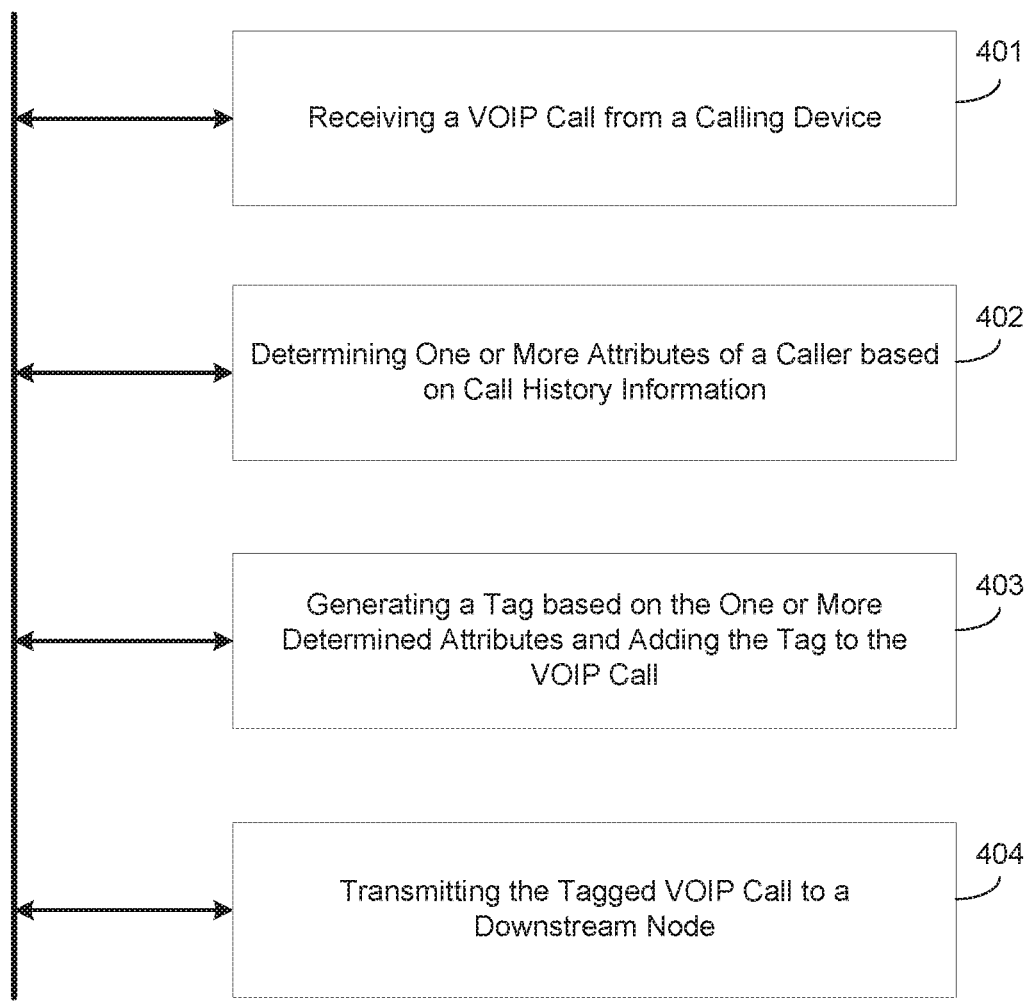

QUEUING CALLS BASED ON DISTURBANCE

CROSS-REFERENCE TO RELATED APPLICATIONS

This application is related to co-pending U.S. non-provisional patent application entitled, "MITIGATING DISTURBANCES AT A CALL CENTER" both of which were filed on the same day and each incorporated herein by reference in its entirety.

BACKGROUND

A public safety answering point (PSAP), also referred to as a public safety access point, is a call station staffed to receive emergency calls (e.g., 911, 112, etc.) routed by a telephone network such as a public switched telephone network (PSTN). A PSAP is often equipped with a comprehensive range of components to meet public safety communication goals including telephone systems and controllers, workstations, mapping and radio applications, computer-aided dispatch, and the like. During operation, an emergency call routed to a PSAP may be answered by a trained official referred to as a dispatcher.

Recently, 9-1-1 call centers have been offering citizens the opportunity to send telephone calls and text messages for help. These applications support calls over PSTNs, and the like. In many cases, the calls are converted from the PSTN into a Voice over IP (VOIP) call, which is then routed to the PSAP call center. This allows PSAPs to answer phone calls and text messages.

PSAP's are a limited resource. For example, there may only be a few PSAPs that are actively being operated per area, town, division, etc. Therefore, preventing attacks on a PSAP or preventing non-emergency calls from saturating the system can be of the utmost importance.

SUMMARY

One example embodiment may provide an apparatus that includes a network interface configured to receive, via a telephone network, a Voice over IP (VOIP) call from a network device, and a processor configured to one or more of detect a disturbance value from a tag that has been added to a VOIP message of the VOIP call, determine an answer priority of the VOIP call based on the disturbance value, and process the VOIP call based on the determined answer priority.

Another example embodiment may provide a method that includes one or more of receiving, via a telephone network, a Voice over IP (VOIP) call from a network device, detecting a disturbance value from a tag that has been added to a VOIP message of the VOIP call, determining an answer priority of the VOIP call based on the disturbance value, and processing the VOIP call based on the determined answer priority.

A further example embodiment may provide a non-transitory computer readable medium comprising instructions, that when read by a processor, cause the processor to perform one or more of receiving, via a telephone network, a Voice over IP (VOIP) call from a network device, detecting a disturbance value from a tag that has been added to a VOIP message of the VOIP call, determining an answer priority of the VOIP call based on the disturbance value, and processing the VOIP call based on the determined answer priority.

BRIEF DESCRIPTION OF THE DRAWINGS

FIG. 2B is a diagram illustrating a message that has been tagged with a disturbance value according to example embodiments.

FIG. 4A is a diagram illustrating a method of tagging a call identified as a disturbance according to example embodiments.

DETAILED DESCRIPTION

Figure 1:
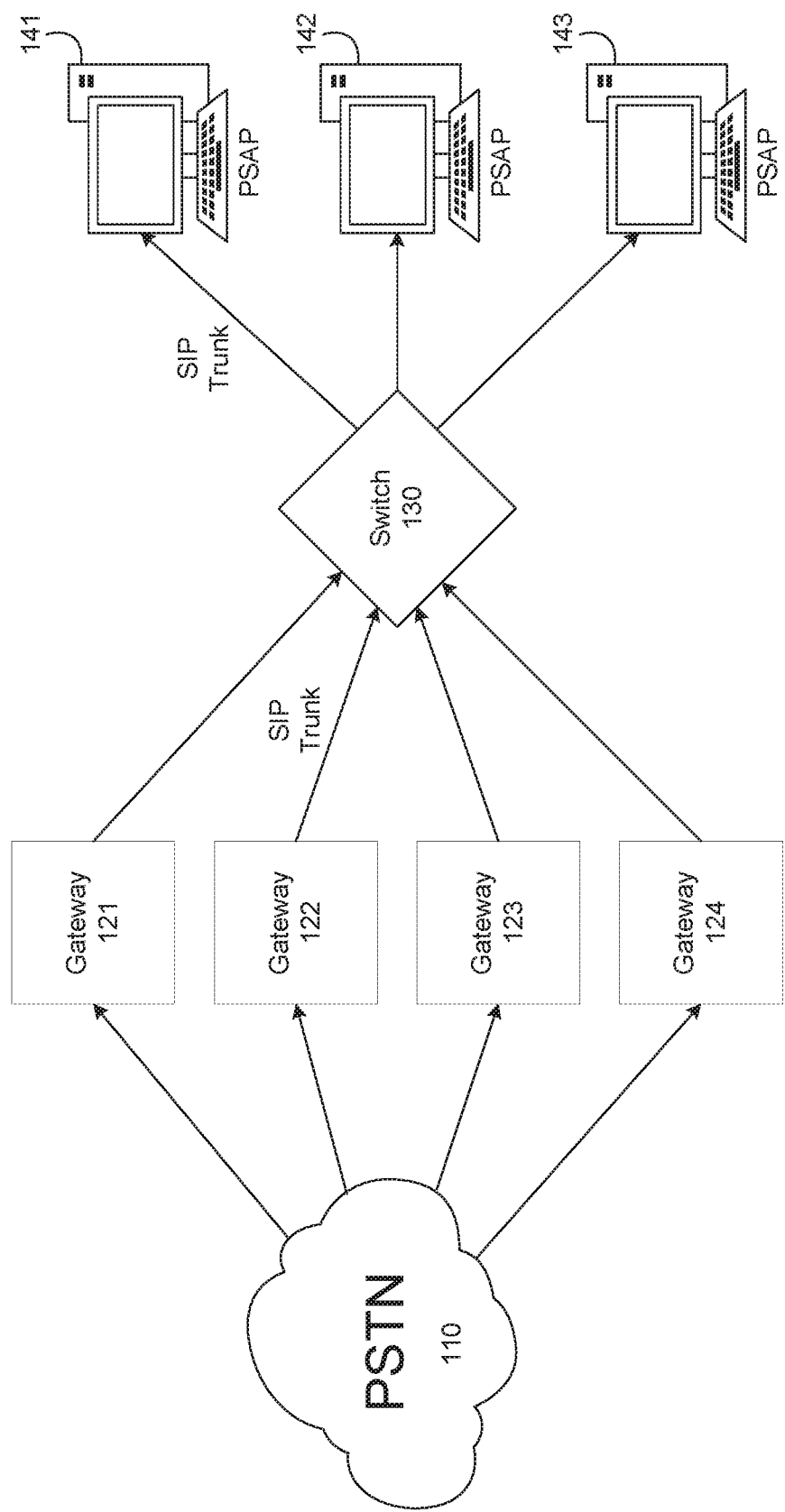
FIG. 1 is a diagram illustrating a telephone communication network according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Traditional call networks are capable of blocking phone calls from unwanted numbers. For example, a user can choose to block specific phone numbers from causing their phone to ring, and even block the call from coming in entirely. As another example, users can add their phone number to a do-not-call list, etc. However, arbitrarily blocking or dropping a telephone call may not be useful when there is still a possibility that the caller is calling for legitimate reasons, and not unsolicited reasons such as sales, denial of service attacks, unnecessary emergency calls, or the like.

The example embodiments are directed to a system which can filter calls before they are received by a call station, call center, etc., such as a PSAP, a hospital, a local center, or the like, and deprioritize calls that are a possible disturbance. By deprioritizing the call, a call center may still answer the call, but at a time that is more convenient. This can be especially useful for emergency call centers that implement PSAPs, hospitals, emergency services, and the like. Accordingly, congestion at a call center can be reduced or even prevented by reducing the number of urgent or emergency calls through deprioritizing calls that are likely to be non-emergencies, disturbances, denial of service, or some other kind of irregular behavior.

According to various embodiments, a host system may be disposed somewhere in the call network such as a service provider, a router, a server, a switch, etc., and may filter calls that are likely to be a disturbance of some kind to the call center. For example, the system can identify suspicious calls that are likely to be a non-emergency situation such as a denial of service attack, a complaint, a question, a prank call, or the like. The disturbance represents a call purpose that is irregular, unintended for the call center, or the like, such as a non-emergency situation for an emergency line, an attack such as a denial of service attack, or the like.

According to various embodiments, the host system may evaluate a call history of a calling device to determine whether the current call from the calling device is a likely disturbance of some kind, or whether the calling device is a legitimate call. If a likely disturbance is detected, the host system may add a tag to the call (e.g., to a VOIP message, etc.) which provides additional information such as the type of disturbance, a value of suspicion or a likelihood of the disturbance, a reason for the disturbance, etc. This information can be transmitted to an answering point such as a PSAP.

As another example, the answering point may detect the tag that has been added to the call, and prioritize the call accordingly. For example, the answering point may maintain a queue of incoming calls. When a call is labeled as a possible disturbance, the answering point may reorganize the call within the queue such that the call is not answered in chronological order, but is instead answered after all other non-disturbance calls have been addressed. As another example, the answering point may reroute the call to another point such as a non-emergency line, or the like, thereby alleviating the load on the answering point. As another example, if the call may be dropped/blocked such as if the call is determined to be a DOS attack, or the like.

As described herein, a telephone call or simply a call may refer to a VOIP call such as a session initiate protocol (SIP) call, or the like. VOIP calls can be sent with data attributes in the form of tags. An example of a tag is an Extensible Markup Language (XML) tag. The tag may be added to a field within the VOIP message. For example, the tag may be embedded within an optional header field of a SIP message, as defined by RFC 3261. For example, section 8.1.1.10 defines an optional header field which can be added to a SIP message. In some embodiments, the tag can be embedded within the optional header field, or any other field desired. The tag can convey information or a classification which may be used to apply a priority to the call.

In some embodiments, the host system may determine a score which indicates a likelihood that the incoming call is a disturbance of some kind. For example, the host system may evaluate prior call history information such as frequency of calls, blacklists, or the like. Also, the host system may use machine learning to predict when a caller/calling device is a disturbance using historical call data of the caller or other attributes of the caller such as a geographical area, a time of day, a frequency of calls, and the like. In some embodiments, the host system may detect when a caller has called too frequently, and automatically label the call as a disturbance. For example, a caller that has called more than 5 times in a 24 hour period may automatically be assigned a high likelihood of being a disturbance.

The host system may generate and store various data attributes within the tag. Below is an example of a tag that can be added to an incoming call.

Disturbance=75%
Reason=Too Many Calls
Recommended Action=Lower Priority

In this example, the host system adds a disturbance value/score of 75%, a reason for the score which is too many frequency calls, and a recommended action to take by the answering point such as lowering the priority of the call. It should be appreciated that the data attributes that may be included in the tag are flexible and not limited to any particular type of data attributes or any particular amount of data attributes.

In this case, the answering point may be designed to take the recommendation from the host system, and automatically implement the recommendation. As another example, the answering point may include a local configuration that takes action based on the recommendation as well as other data points such as metrics, the reason for the disturbance, other calls in the priority queue already, and the like.

FIG. 1 illustrates a telephone communication network 100 ("network 100") according to example embodiments. For example, the network 100 may include a plurality of nodes that are connected to one another via a network, a combination of networks, and the like. The network and/or networks may include mobile networks, landline networks, data networks, etc. The nodes may include servers/gateways, routers, switches, calling devices, answering points (e.g., PSAP's), and the like.

Referring to FIG. 1, a call may be placed from a mobile device, a landline, etc., and transmitted from a public switched telephone network (PSTN) 110, or the like. The call may be received by a computing terminal (e.g., gateway 112) from among a plurality of gateways 121-124 within the network 100. The gateway 122 may convert the call from the PSTN into a VOIP call such as a SIP call, according to RFC 3261. The converted call may be transmitted from the gateway 122 to a switch 130 via the Internet. Here, the gateway may use SIP trunking to send voice or text communications to the switch 130 via the Internet. The SIP trunk may utilize a packet switch network. In this case, the gateway may break the call into digital packets (e.g., messages) that are sent across the SIP trunk to the switch 130. It should also be appreciated that other VOIP protocols may be used, instead of SIP.

The gateways 121-124 may be computing systems, such as servers, etc., that include codecs which convert the audio voice signals from the telephone call received via the PSTN 110 into digital form for transmission over the Internet. When the packets reach their destination such as the switch 130 or one of a plurality of PSAPs 141-143, the destination may convert the packets with compressed audio signals back to an uncompressed form for playing the audio/voice signal of the call. Although not shown in the example of FIG. 1, the network 100 may include additional and/or different components such as a recorder for recording the calls, an automatic location identification (ALI) provider that provides a geographic location of the call, and which can be displayed by the receiving PSAP 141-143, used by the switch 130 for routing among the PSAP 141-143, and the like.

Figure 2A:
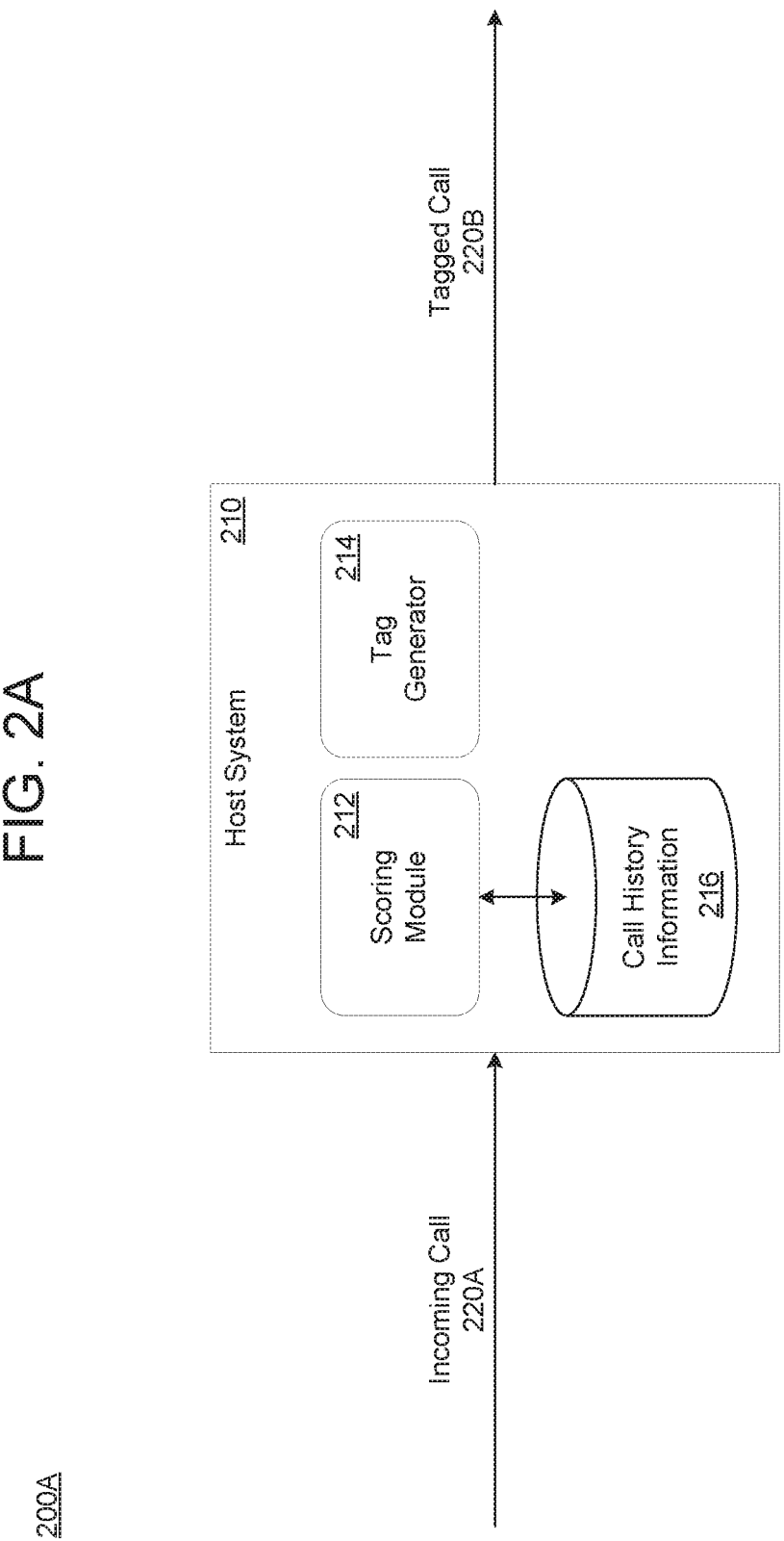
FIG. 2A is a diagram illustrating a host system that tags incoming calls according to example embodiments.
Figure 3:
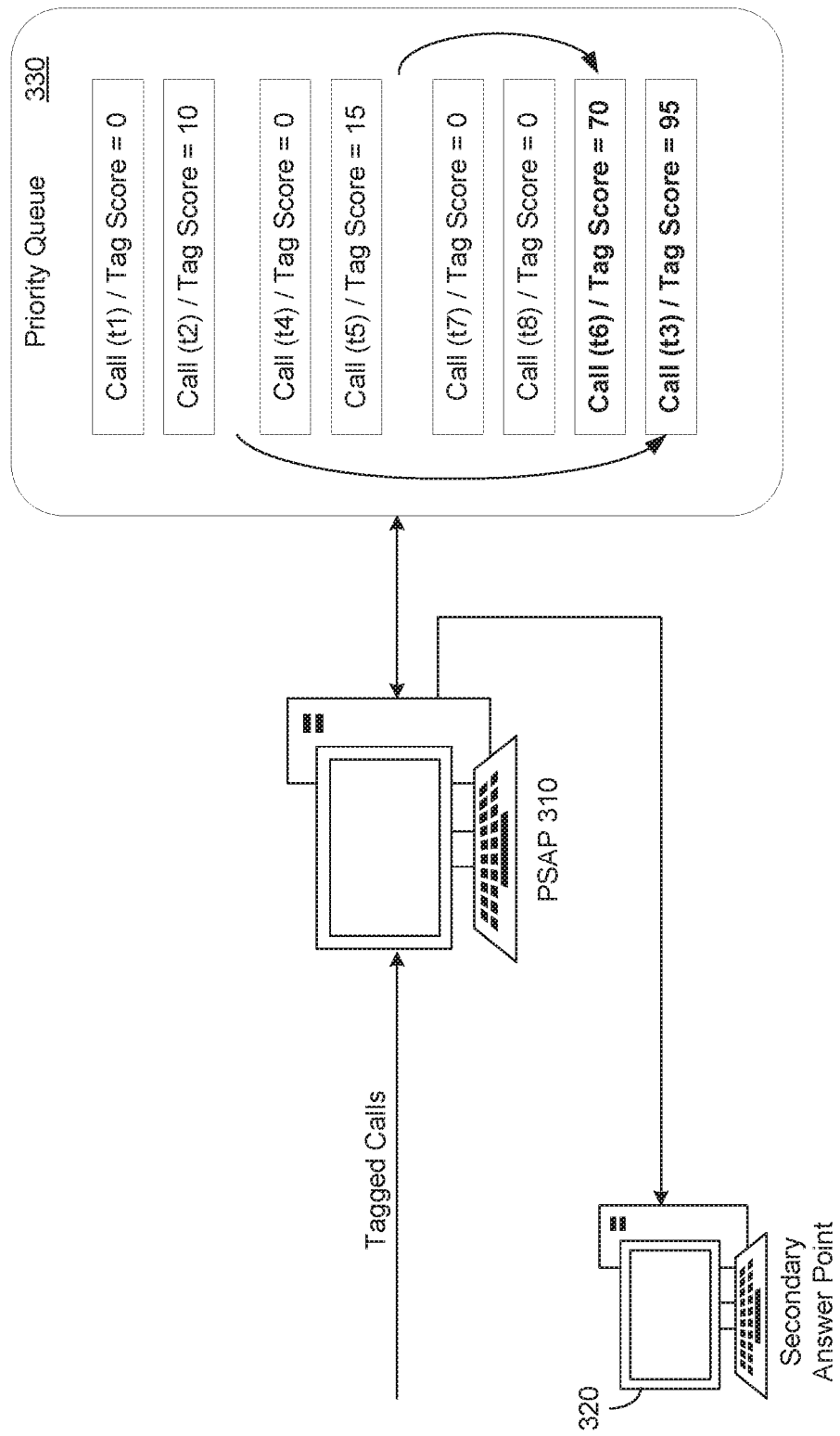
FIG. 3 is a diagram illustrating a process of an answering point organizing tagged calls in a queue according to example embodiments.

According to various embodiments, the deprioritizing of telephone calls can be bifurcated among a host system 210 such as described in FIG. 2A, and a PSAP 310 such as described in FIG. 3, which is downstream from the host system 210. For example, the host system 210 may identify and tag calls that are likely to be disturbances, and the PSAP 310 may read the tags from the call messages, packets, etc., and process the disturbance calls based thereon. For example, the PSAP 310 may implement a queue, and deprioritize the incoming call within the queue behind other calls that came later in time thus taking the disturbance call out of chronological order.

The host system 210 may be implemented in the form of a software program, application, service, etc., that is installed and running on any of the nodes in the network 100 shown in FIG. 1, or other nodes not show. For example, the host system 210 may be installed on a service provider, a gateway/server, a router, a switch, a PSAP or other answering point, and the like. The host system 210 may receive an incoming call that is intended for a call station/answering point such as a PSAP and tag the call with one or more identifiers, labels, values, etc., which identify whether the call is a disturbance.

Referring to FIG. 2A, the host system may receive an incoming call and analyze a call history of a caller using call lists, machine learning, frequency of calls, etc. For example, a scoring module 212 may access a call history information database 216 for call logs, blacklists, watch lists, and the like, and use this information to determine whether the call is a disturbance. As another example, the scoring module 212 may access a recent call log of a phone number associated with an incoming call to determine how many times the phone number has dialed 9-1-1 within a predetermined window of time, such as the last 12 hours, 24 hours, 48 hours, 1 week, 1 month, etc. If the scoring module detects that the calls are too frequent, the scoring module 212 may determine the call is a disturbance.

A tag generator may generate a tag and embed the tag within a packet or message of the call. The tag may include any desired identifiers that can identify a likelihood of the call being a disturbance as determined by the scoring module 212. As a non-limiting example, the tag may include a score value (e.g., between 0-100, etc.), a descriptive label (e.g., highly likely, possible, less likely, or not likely, etc.), a reason for the score, a suggested action to take by the downstream node, and the like. The tag may be an XML tag, and the call may be a SIP call. Here, the tag generator 214 of the host system 210 may add the XML tag to a header of the SIP message before it is sent to the PSAP. For example, an incoming call 220A may be converted to a tagged call 220B, as further explained with respect to FIG. 2B.

Although not shown in FIG. 2A, the host system 210 may convert the incoming call from an audio signal in a PSTN network to a VOIP call. The conversion may convert an audio signal into a series of data packets that include the audio data. The conversion may compress the packets and transmits the packets to a receiver such as the PSAP. The received packets may be decompressed to obtain the original audio. The example embodiments can leverage the use of VOIP in emergency call systems to embed additional data within a VOIP message/packet such as a SIP message.

FIG. 2B illustrates a tagged VOIP call message 220B that has been tagged with a disturbance value according to example embodiments. Referring to FIG. 2B, the call message 220B includes a starting line or field 222, a header field 224, a separator field 226, and a message body 228. The format of the call message 220B may be implemented via an application programming interface (API) that is disposed on nodes in the network such as a gateway server, a PSAP, a router, a switch, etc.

In some embodiments, the VOIP call message 220B may adhere to an RFC 3261 protocol which is a Session Initiation Protocol (SIP). The RFC 3261 provides an application-layer control (signaling) protocol for creating, modifying, and terminating sessions with one or more participants. These sessions include Internet telephone calls, multimedia distribution, and multimedia conferences. For example, Section 8.1.1.10 of RFC 3261 provides that the header of a SIP message may include optional fields.

The example embodiments may leverage these optional header fields for storing/embedding an XML tag with disturbance information therein. For example, the header 224 of the tagged VOIP call message 200B may include a disturbance value 230, a reason for the disturbance 231, and a recommend action to take 232. Each of the disturbance value 230, the reason 231, and the recommended action 232 may be in XML format. It should also be appreciated that the tag may include any desired descriptors/fields. The tag is therefore flexible in that it can be modified or dynamically adjusted to meet any prioritization need. For example, rather than processing disturbances, the system may process sales calls. Here, the score may indicate a likelihood of interest in a sale, etc.

FIG. 3 illustrates a process 300 of an answering point 310 organizing tagged calls in a queue 330 according to example embodiments. Referring to FIG. 3, the answering point (PSAP 310) may receive tagged calls, such as the tagged call 220B shown in FIG. 2B, from an upstream node that includes the host system 210 shown in FIG. 2A. Here, the PSAP 310 may be downstream from the host system 210. In this example, the PSAP 310 manages a priority queue 330 of incoming calls. In this case, calls that are tagged as being likely disturbances are moved to the bottom of the queue 330 or rerouted to another answering point such as secondary answering point 320, which may be a non-emergency line.

According to various embodiments, the PSAP 310 may include software installed therein that can read the header of the incoming VOIP messages (such as tagged call 220B), and identify the disturbance values, reasons, actions, etc. Furthermore, the PSAP 310 may automatically perform the recommended action included in the tag, or the PSAP 310 may include logic for determining an action to take based on other factors such as the other data in the tag, a time of day, a number of calls in the queue 330, and the like.

In this example, incoming calls that are tagged with a score of at least 50 are moved to the bottom of the queue. Furthermore, if more than one call is moved to the bottom of the queue, the multiple calls are organized according to the lowest score. Therefore, in this example, both calls at t3 (third in chronological order) and at t6 (sixth in chronological order) are moved to the bottom of the queue 330 where they can be processed last. Furthermore, the moved calls are then ordered based on their scores. In this case, the sixth call (t6) has a lower likelihood of being a disturbance than the third call (t3) because the sixth call has a likelihood score of 70 and the third call has a likelihood score of 95 (where 100 represents the most likely score of being a disturbance). Thus, the PSAP 310 can process (e.g., answer the calls) in the newly arranged order as shown in the queue 330 rather than in chronological order.

FIG. 4A illustrates a method 400 of tagging a call identified as a disturbance according to example embodiments. For example, the method 400 may be performed by a node within a telephone network such as a gateway, server, router, switch, a PSAP, and the like. Referring to FIG. 4A, in 401, the method may include receiving a telephone call from a calling device. For example, the telephone call may include a telephone call from a mobile network, a landline network, or the like. The call may initially be in an audio format, and converted to a VOIP format. As another example, the call may be in a VOIP format. In this case, the call may be transmitted in the form of packets/messages over a packet network.

In 402, the method may include determining one or more attributes of a caller associated with the calling device based on call history information of the calling device. For example, the host system may maintain a watch list, a blacklist, a suspicious list, etc., of callers and their previous call activity that has been labeled by the host system or by other systems. In this example, the lists may identify possible DOS attackers, spammers, etc., and the system can determine they are disturbances.

As another example, the host system may detect that a call frequency of a caller from a call log, or other data that is stored at the host system. In this case, if a caller has called too many times during a predetermined period (e.g., within a 24 hour window, etc.), the caller can be determined to be a disturbance. As another example, the host system may use machine learning to process call history information of the same caller or other similar callers to determine whether the caller is a likely disturbance. For example, callers during a same time period, a same location, etc., may be clustered and evaluated using machine learning to identify patterns in call behavior which can be used to predict whether a new call from the same area, time period, etc., is a disturbance.

In 403, the method may include generating a tag based on the one or more determined attributes and adding the generated tag to a Voice over IP (VOIP) call message of the telephone call. Furthermore, in 404, the method may include transmitting the tagged VOIP call message from the calling device to a downstream node.

In some embodiments, the VOIP call message may include a session initiate protocol (SIP) message, and the adding comprises adding the tag within the SIP message. In some embodiments, the generating may include generate an Extensible Markup Language (XML) tag comprising a disturbance value included therein that is added to the VOIP message such as the SIP message. For example, tag may be stored within an optional header field of a SIP call message, a VOIP call message, etc.

Figure 4B:
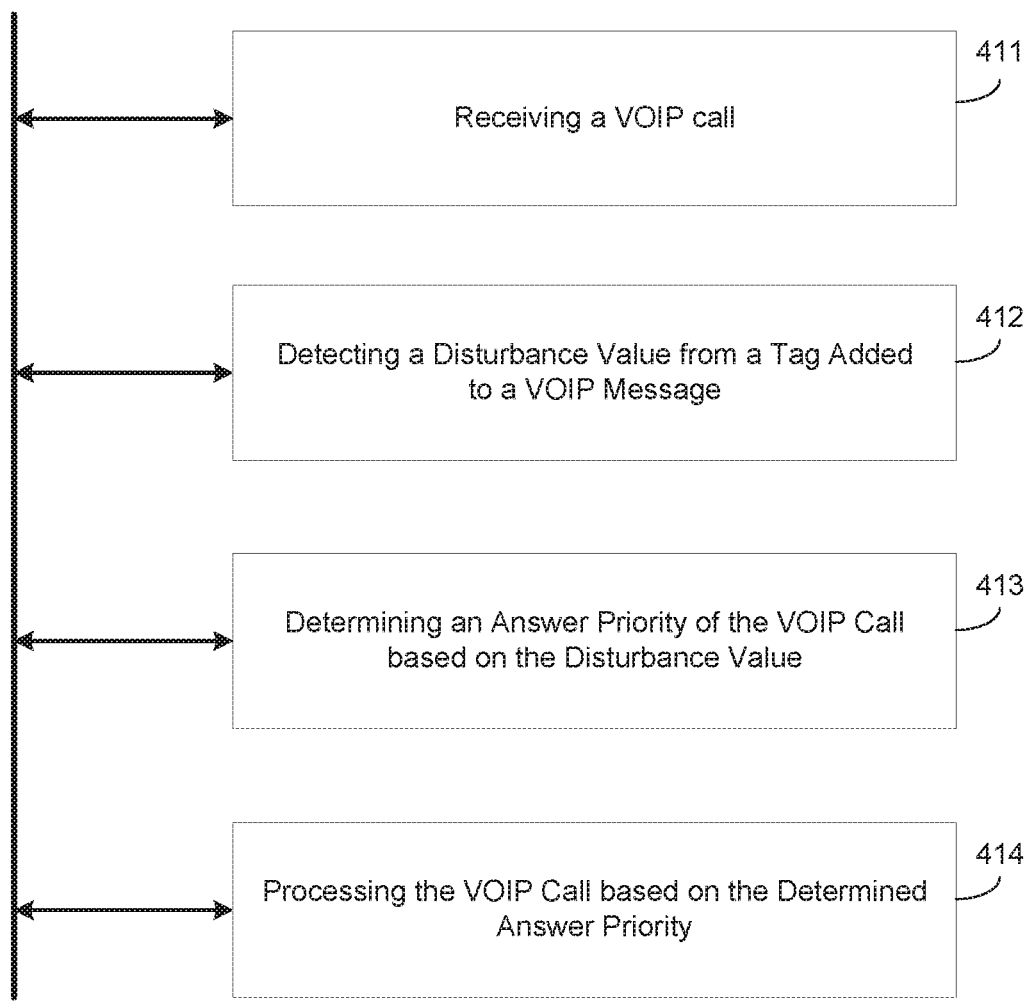
FIG. 4B is a diagram illustrating a method of processing a call that has been labeled as a disturbance according to example embodiments.

In some embodiments, the determining may include determining a priority value for the telephone call based on the call history information, and the generating the tag comprises inserting the priority value within the tag. In some embodiments, the determining may include determining a likelihood of disturbance of the caller based on a machine learning model, and the generating the tag comprises inserting a likelihood value representing the determined likelihood of disturbance within the tag FIG. 4B illustrates a method 410 of processing a call that has been labeled as a disturbance according to example embodiments. For example, the method 410 may be performed by a node (e.g., router, server, switch, etc.,) in a call network, an answering point in a call network such as a PSAP, or the like. Referring to FIG. 4B, in 411, the method may include receiving, via a telephone network, a VOIP call from a network device. For example, the call may be received from a gateway, a router, a switch, or the like. According to various embodiments, the VOIP call may include a tag that is embedded therein and which includes one or more data attributes of a caller that has been added to a VOIP message.

In 412, the method may include detecting a disturbance value from the tag that has been added to the VOIP message of the VOIP call. For example, the detecting may include reading a descriptive identifier from within a header of the VOIP message which includes a likelihood that the caller is a disturbance, the reason (e.g., blacklisted, too many calls, machine learning, etc.), a priority to set, an action to take, and the like.

In 413, the method may include determining an answer priority of the VOIP call based on the disturbance value. Furthermore, in 414, the method may include processing the VOIP call based on the determined answer priority. For example, the processing may include enqueuing the VOIP call within a priority queue in which incoming calls are arranged based on disturbance instead of, or in addition to chronological order. Furthermore, the processing may include rearranging the VOIP call so that it is answered out of chronological order based on the detected disturbance value included within the tag. For example, the VOIP call may be detected as a likely disturbance and placed at the end of the queue, or in an area of the queue that is not processed until all other non-disturbance calls are handled. As another example, the VOIP call may be rerouted to another system such as a non-emergency line, etc.

In some embodiments, the VOIP message may include a session initiate protocol (SIP) message. In some embodiments, the method may further include detecting the disturbance value from a header of an Extensible Markup Language (XML) tag included within the SIP message. In some embodiments, the method may include rerouting the VOIP call to a different phone number in response to the detected disturbance value matching a predefined value. For example, if the detected disturbance value is at or above 50%, but below 80%, the call may be routed to a non-emergency answering point. In this same example, if the call is above 80% it can be routed to the bottom of the queue, dropped, or even blocked.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
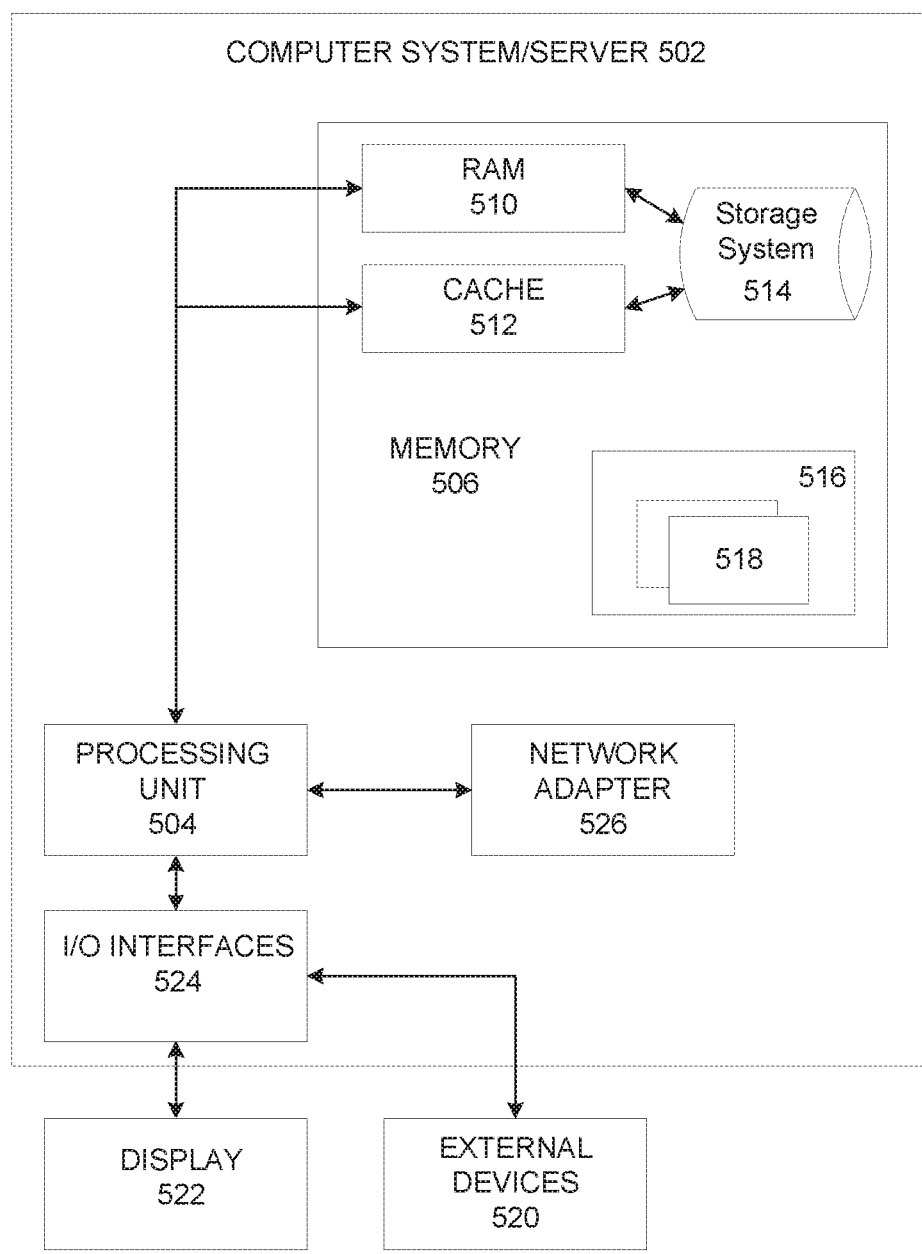
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like. As another example, the computing node 500 may be a cloud platform, a database, an on-premises server, a user device, a combination of devices, and the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus in a communication network, the apparatus comprising:
   a memory that stores a program; and
   a processor configured to execute the program to
      detect a disturbance value from a tag embedded in a Voice over IP (VOIP) message of a VOIP call,
      identify a priority to answer the VOIP call based on the disturbance value, and,
      based on the priority, delay answering the VOIP call until other calls having lower disturbance values or no disturbance values are answered.

2. The apparatus of claim 1, wherein the VOIP call comprises a session initiate protocol (SIP) message.

3. The apparatus of claim 2, wherein the processor is configured to execute the program to detect the disturbance value from a header of an Extensible Markup Language (XML) tag included within the SIP message.

4. The apparatus of claim 1, wherein the processor is configured to execute the program to reroute the VOIP call to a different phone number in response to a determination that the disturbance value has a predefined value.

5. The apparatus of claim 1, wherein the disturbance value is based on a frequency of calls of a calling device.

6. The apparatus of claim 1, wherein the processor is configured to execute the program to detect a second disturbance value from a second tag embedded in a second message of a second call and order the VOIP call and the second call, based on the disturbance value and the second disturbance value.

7. A method, comprising:
   detecting, by a node in a communication network, a disturbance value from a tag embedded in a Voice over IP (VOIP) message of a VOIP call;
   identifying, by the node, a priority to answer the VOIP call based on the disturbance value; and
   based on the priority, delay answering, by the node, the VOIP call until other calls having lower disturbance values or no disturbance values are answered.

8. The method of claim 7, wherein the VOIP call comprises a session initiate protocol (SIP) message.

9. The method of claim 8, wherein the detecting the disturbance value comprises:
   detecting the disturbance value from a header of an Extensible Markup Language (XML) tag included within the SIP message.

10. The method of claim 7, further comprising:
    rerouting the VOIP call to a different phone number in response to a determination that the disturbance value has a predefined value.

11. The method of claim 7, wherein the disturbance value is based on a frequency of calls of a calling device.

12. The method of claim 7, further comprising:
  detecting a second disturbance value from a second tag embedded in a second message of a second call; and
  ordering the VOIP call and the second call, based on the disturbance value and the second disturbance value.

13. A non-transitory, computer-readable medium comprising one or more instructions that, when executed by a processor of a node in a communication system, cause the processor to perform:
  detecting a disturbance value from a tag embedded in a Voice over IP (VOIP) message of a VOIP call;
  identifying a priority to answer the VOIP call based on the disturbance value; and
  based on the priority, delaying answering the VOIP call until other calls having lower disturbance values or no disturbance values are answered.

14. The non-transitory, computer-readable medium of claim 13, wherein the VOIP call comprises a session initiate protocol (SIP) message.

15. The non-transitory, computer-readable medium of claim 14, wherein the detecting the disturbance value comprises:
  detecting the disturbance value from a header of an Extensible Markup Language (XML) tag included within the SIP message.

16. The non-transitory, computer-readable medium of claim 13, wherein the one or more instructions further cause the processor to perform:
  rerouting the VOIP call to a different phone number in response to a determination that the disturbance value has a predefined value.

17. The non-transitory, computer-readable medium of claim 13, wherein the one or more instructions further cause the processor to perform:
  detecting a second disturbance value from a second tag embedded in a second message of a second call; and
  ordering the VOIP call and the second call, based on the disturbance value and the second disturbance value.

\* \* \* \* \*